March 5, 1940.                R. E. HORGER                2,192,378
CAP BOLT LOCK
Filed April 30, 1938
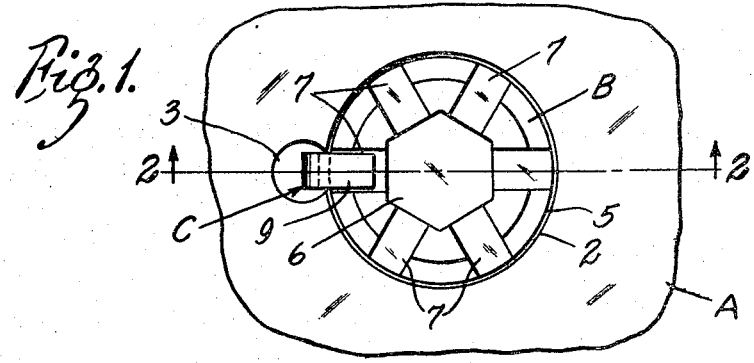
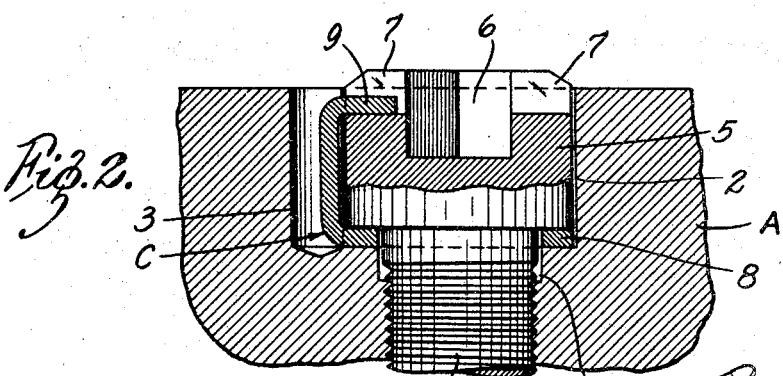
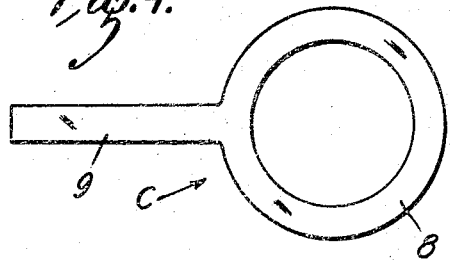
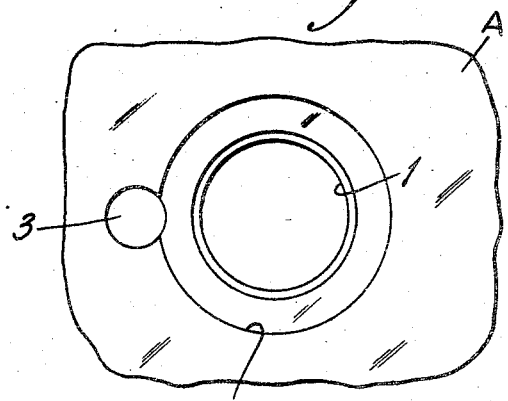
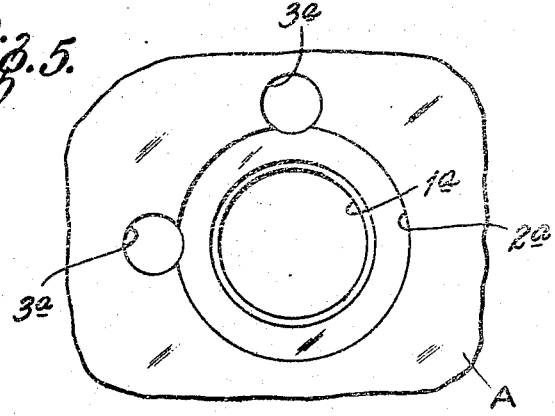
INVENTOR:
Ralph E. Horger,
by Carr Karr & Gravely,
HIS ATTORNEYS.

Patented Mar. 5, 1940

2,192,378

UNITED STATES PATENT OFFICE 2,192,378

CAP BOLT LOCK

Ralph E. Horger, Canton, Ohio, assignor to The Timken Roller Bearing Company, Canton, Ohio, a corporation of Ohio Application April 30, 1938, Serial No. 205,174

4 Claims. (Cl. 151—32)

This invention relates to cap bolt locks, particularly locks for countersunk fillister head cap screws. It has for its principal object to provide a simple, economical and practical means that will prevent rotation of such countersunk screws and that will permit ready insertion and removal of the locking element without injury to the parts associated therewith. The invention consists in the cap bolt lock and in the construction, combination and arrangements of parts hereinafter described and claimed.

In the accompanying drawing, which forms part of this specification and wherein like symbols refer to like parts wherever they occur:

Fig. 1 is a face view of a cap screw and a portion of the member through which it passes provided with locking means embodying my invention;

Fig. 2 is a section on the line 2—2 in Fig. 1;

Fig. 3 is a view similar to Fig. 1, showing the shape of the counterbored screw receiving hole;

Fig. 4 is a detail view of the lock washer; and

Fig. 5 is a view similar to Fig. 3, showing a modification of the invention.

In the accompanying drawing, A indicates a member having a bore 1 extending therethrough with a flat bottom enlargement or a counterbore 2 at the mouth thereof, the wall of said counterbore having a recess or undercut groove 3 therein extending from top to bottom thereof. B indicates a cap bolt or screw having a threaded body 4 disposed in the bore 1 of the member A and a cylindrical head 5 disposed in the counterbore 2 and having at its outer end a central flat-sided bar wrench socket 6 and a series of radially disposed circumferentially spaced recesses or grooves 7 extending from said socket to the outer periphery of said head.

The cap screw B is prevented from turning in the bore 1 of the member A by means of a lock washer C comprising an annular screw receiving body portion 8 having a locking finger 9 extending radially outwardly therefrom. The annular body portion 8 of the lock washer is clamped between the screw head 5 and the bottom of the counterbore 2; and the locking finger 9 of said washer has a portion bent up alongside of said head and fitting into the groove 3 in the counterbore 2 and a portion extending into and seating against the bottom of an adjacent groove 7 in said head. As shown in Fig. 5, the counterbored portion 2a of the screw hole 1a may be provided with two finger-receiving grooves 3a instead of the single groove 3 hereinbefore described, thereby increasing the number of angular locking positions of the cap screw.

By the arrangement described, the portion of the bent finger 9 of the lock washer C that fits within the groove 3 in the wall of the counterbore 2 of the screw hole 1 prevents rotation of said washer while the portion of said finger that extends into the adjacent radial groove 7 in the screw head 5 prevents rotation of the screw B. The lock washer is firmly clamped against axial movement between the screw head and the bottom of the counterbore. The cap screw may be readily removed merely by bending the inwardly bent free outer end portion thereof upwardly and outwardly clear of the periphery of the head of said screw, leaving said portion in position to be again bent into locking position when the cap screw is replaced.

What I claim is:

1. The combination of a member having a hole with a counterbore having a longitudinal recess in the wall thereof, a member having a body portion disposed in said hole and a head disposed in said counterbore and having a recess in register with the recess in said counterbore, and a member having a portion disposed between said head and the bottom of said counterbore and a single portion disposed both in the registering recesses in said counterbore and said head.

2. The combination of a member having a hole with a counterbore having a longitudinal recess in the wall thereof, a member having a body portion disposed in said hole and a head disposed in said counterbore and having a recess in register with the recess in said counterbore, and a member having an annular portion surrounding said body portion between said head and the bottom of said counterbore and an extension extending into the recess in said counterbore and thence into the recess in said head.

3. The combination of a member having a hole with a counterbore having a recess in the wall thereof, a cap bolt having a body portion disposed in said hole and a head disposed in said counterbore and having a recess in register with the recess in said counterbore, and a flat washer surrounding said cap bolt between the head thereof and the bottom of said counterbore and having a finger extending into the recesses in said counterbore and said head.

4. The combination of a member having a hole with a counterbore having a plurality of circumferentially spaced longitudinal grooves in the wall thereof extending substantially from top to bottom thereof, a cap bolt having a body portion disposed in said hole and a head disposed in said counterbore and having a plurality of radially disposed grooves in its outer end, and a washer surrounding said cap bolt and clamped between the head thereof and the bottom of said counterbore and having a single outwardly extending finger bent to continuously engage one of the grooves in said counterbore from top to bottom of said groove and one of the radial grooves in said head.

RALPH E. HORGER.